United States Patent
Bonsen

(10) Patent No.: US 7,926,603 B2
(45) Date of Patent: Apr. 19, 2011

(54) HOOD TILT LOCKING SYSTEM

(75) Inventor: Greg William Bonsen, Bellevue, WA (US)

(73) Assignee: PACCAR Inc, Bellevue, WA (US)

( * ) Notice: Subject to any disclaimer, the term of this patent is extended or adjusted under 35 U.S.C. 154(b) by 133 days.

(21) Appl. No.: 12/255,333

(22) Filed: Oct. 21, 2008

(65) Prior Publication Data
US 2010/0096202 A1    Apr. 22, 2010

(51) Int. Cl.
*B62D 25/12* (2006.01)

(52) U.S. Cl. .................. 180/69.21; 296/193.11; 292/338

(58) Field of Classification Search ............... 180/69.21; 296/193.11; 248/352; 292/338; 16/82
See application file for complete search history.

(56) References Cited

U.S. PATENT DOCUMENTS

| | | | |
|---|---|---|---|
| 2,135,613 A | 11/1938 | Orlow | |
| 2,193,111 A | 3/1940 | Peterson | |
| 2,193,112 A | 3/1940 | Peterson | |
| 3,078,001 A | 2/1963 | Young | |
| 4,449,702 A | 5/1984 | Hasegawa | |
| 4,596,383 A | 6/1986 | Howard | |
| 4,634,170 A | 1/1987 | Lach | |
| 4,824,082 A | 4/1989 | Schaupp | |
| 4,890,703 A | 1/1990 | Hathaway | |
| 5,120,030 A | 6/1992 | Lin | |
| 5,358,225 A | 10/1994 | Völpel | |
| 5,549,051 A * | 8/1996 | Zimmerman | 108/81 |
| 5,611,584 A | 3/1997 | Giese | |
| 5,791,428 A | 8/1998 | Noll | |
| 5,941,330 A | 8/1999 | Miller | |
| 5,992,550 A * | 11/1999 | Gronlund | 180/69.21 |
| 6,273,405 B2 | 8/2001 | Okamoto | |
| 6,871,716 B2 * | 3/2005 | Sanderson | 180/69.21 |
| 6,892,843 B2 | 5/2005 | Schillaci | |
| 6,910,731 B2 | 6/2005 | Albright | |
| 7,261,286 B2 | 8/2007 | McConnell | |
| 2005/0279550 A1 * | 12/2005 | Saville et al. | 180/69.21 |
| 2005/0284678 A1 | 12/2005 | Muia-Longman | |

FOREIGN PATENT DOCUMENTS

JP    2004-262366 A    9/2004

* cited by examiner

*Primary Examiner* — J. Allen Shriver, II
*Assistant Examiner* — Erez Gurari
(74) *Attorney, Agent, or Firm* — Christensen O'Connor Johnson Kindness PLLC

(57) ABSTRACT

The present disclosure provides a hood assembly for a vehicle having a hood coupled to the vehicle and pivotal between open and closed positions. A contoured lever is movably disposed between the hood and the vehicle, and a slot having first and second ends is formed within the lever. A lock detent formed within the contoured lever is in communication with the second end of the slot, and a pin mounted to a portion of the vehicle is slidably received within the slot. When the hood is opened, the pin is received within the lock detent, thereby locking the hood in the open position. The hood assembly also includes a release handle pivotally secured to the lever that is sized and configured to engage the pin when the pin is positioned within the slot.

20 Claims, 12 Drawing Sheets

HOOD TILT LOCKING SYSTEM

BACKGROUND

Conventional heavy duty trucks have a large engine covering hood which tilts about a transverse pivot point located above the bumper to expose the engine for servicing. Although commonly made of lightweight materials, these hoods are nevertheless cumbersome to handle in part because of their heaviness and the relatively long moment arm between the center of gravity of the hood and the pivot axis. Moreover, the hoods are dangerous to the operator when moved into the open position due to inadvertent closures caused by wind or other external forces.

An automatic locking device is often disposed between the hood and a portion of the vehicle to secure the hood in the open position to prevent inadvertent closure of the hood and avoid injuring the operator. For example, some vehicles include a manually activated safety cable assembly that automatically locks the hood in the open position when the hood is opened. The safety cable must be activated by the operator to unlock the hood and move the hood into the closed position. Installing a safety cable assembly within a vehicle is time-consuming, difficult, and expensive. Moreover, the safety cable assembly can interfere with other vehicle components, such as cooling modules, auxiliary coolers, and chassis frame packaging components. The safety cable assembly can also inhibit the vehicle steering.

Thus, it is desired to provide a hood support device having a simplified automatic locking system integrated therein.

SUMMARY

The present disclosure provides a hood assembly for a vehicle having a hood coupled to the vehicle and pivotal between open and closed positions. A contoured lever is movably disposed between the hood and the vehicle, and a slot having first and second ends is formed within the lever. A lock detent formed within the contoured lever is in communication with the second end of the slot, and a pin mounted to a portion of the vehicle is slidably received within the slot. When the hood is opened, the pin is received within the lock detent, thereby locking the hood in the open position. The hood assembly also includes a release handle pivotally secured to the lever that is sized and configured to engage the pin when the pin is positioned within the slot.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein.

DETAILED DESCRIPTION

A hood support 14 formed in accordance with one embodiment of the present disclosure can be seen by referring to FIGS. 1-6. The hood support 14 automatically locks the hood H of a vehicle in an open position until unlocked by an operator. The hood support 14 is shown in combination with a heavy duty truck having a hood H pivotally mounted to a portion of the vehicle, such as the chassis C. It should be appreciated that although the hood support 14 will be hereinafter described with reference to heavy duty trucks, aspects of the hood support 14 have wide application, and may be suitable for use with other vehicles or machines. Moreover, any preferred hood and chassis design may be used. Accordingly, the following descriptions and illustrations herein should be considered illustrative in nature, and thus, not limiting the scope of the present disclosure.

Figure 1:
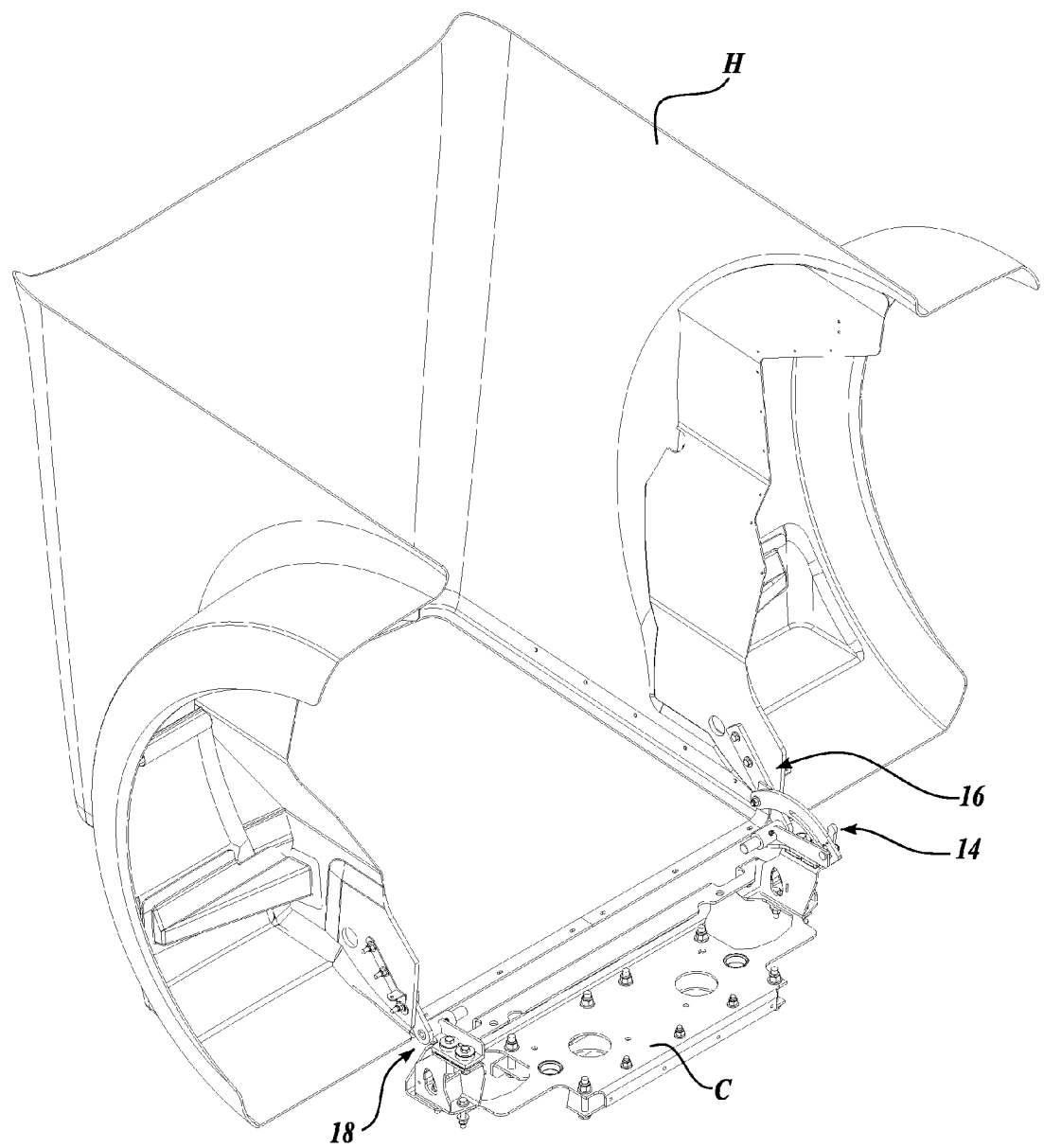
FIG. 1 is an environmental view of one embodiment of a hood support shown in use with a vehicle having a hood moveable between an open and closed position, wherein the hood is in the open position.

Referring to FIG. 1, the hood H is pivotally coupled at its forward end to the chassis C through suitable first and second substantially identical hinge assemblies 16 and 18 well known in the art. The hood H pivots about the first and second hinge assemblies 16 and 18 to move between open and closed positions. It is preferred that the first and second hinge assemblies 16 and 18 are disposed on the right and left sides of the hood H for coupling the hood H to the chassis C. However, it should be appreciated that only one hinge assembly may instead be used. Moreover, any suitable hinge assembly may be used to pivotally couple the hood H to the chassis C.

Figure 2:
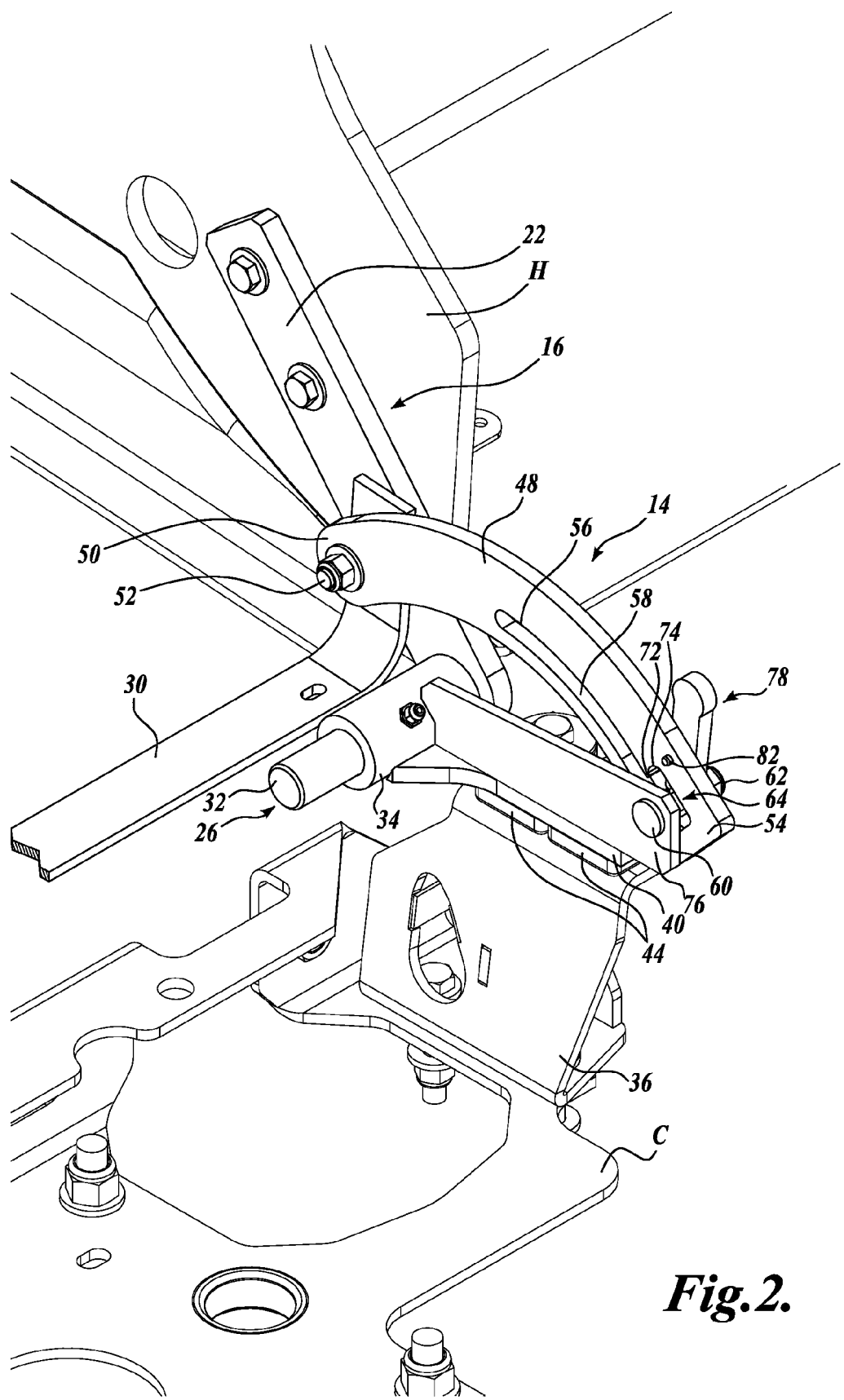
FIG. 2 is an isometric view of the hood support of FIG. 1, wherein the hood is shown in an open, unlocked position.

Referring to FIG. 2, to better illustrate aspects of the hood support 14, the first hinge assembly 16 will be hereinafter generally described. The first hinge assembly 16 includes a hood mount bracket 22 fixedly secured to an inner portion of the hood H at one end and secured to a pivot assembly 26 at the opposite end. The hood mount bracket 22 is secured to the interior of the hood H in any suitable manner. A cross bar 30 or other suitable support structure may be secured between the hood mount brackets 22 of each hinge assembly 16 and 18 to provide structural support to the hood H and hinge assemblies 16 and 18.

The pivot assembly 26 includes a pin 32 journaled for rotation within a collar 34. The hood mount bracket 22 is mounted to an end of the pin 32 such that the hood mount bracket 22 is rotatable with the pin 32 about the center axis of the pin 32. A collar bracket 40 extends outwardly from the collar 34 and is mounted to a chassis mounting bracket 36, wherein the chassis mounting bracket 36 is mounted to the chassis C. In this manner, the pin 32 and hood mount bracket 22 (and therefore the hood H) are pivotable with respect to the chassis C. A pair of elastomeric pads 44 or other suitable dampening devices may be disposed between the chassis mounting bracket 36 and the collar bracket 40 to help absorb shock delivered to the pivot assembly 26 when the hood H is being moved between open and closed positions.

Still referring to FIG. 2, the hood support 14 will now be described in detail. The hood support 14 is disposed between the hood H and the chassis C and is configured to automatically lock the hood H in the open position when the hood H is moved into the open position. The hood support 14 includes a contoured lever 48 that is movably disposed between the hood H and the chassis C. The contoured lever 48 includes first and second ends 50 and 54 and it is pivotally mounted to the hood H at its first end 50. Preferably, the contoured lever 48 pivotally mounts the cross bar 30 to the hood mount bracket 22 with a suitable fastener 52; however, it should be appreciated that the contoured lever 48 may instead be pivotally mounted directly to the hood H in any suitable manner.

Figure 3:
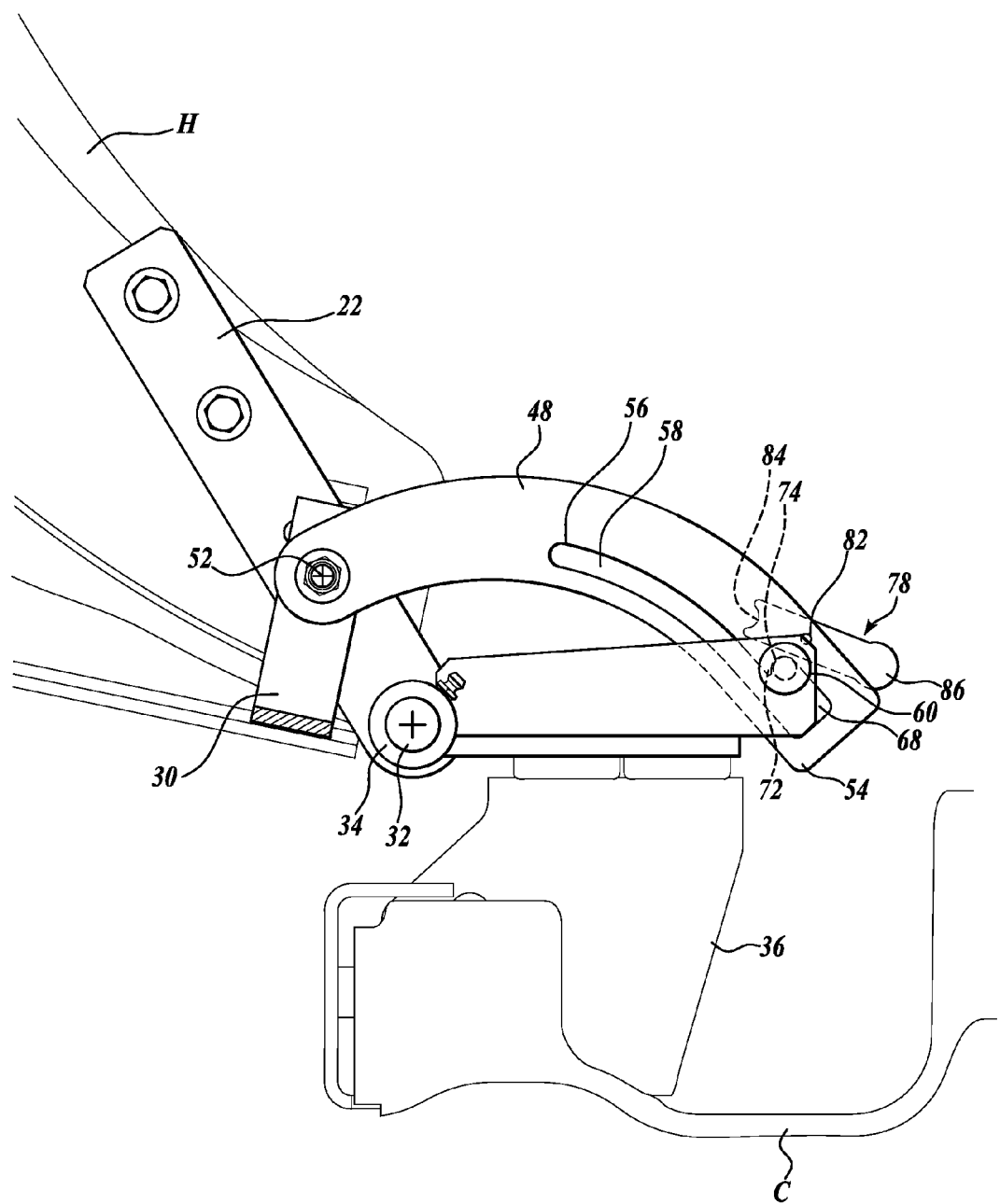
FIG. 3 is a side plan view of the hood support of FIG. 1, wherein the hood is in an open, locked position.

Referring to FIGS. 2 and 3, the contoured lever 48 is movably and adjustably mounted to the chassis C at its second end 54 through a lock pin 60 secured to a lock pin bracket 76. The lock pin bracket 76 is transversely secured to the collar bracket 40 and extends upwardly therefrom. The lock pin 60 extends outwardly from the lock pin bracket 76 to pass through a contoured slot 56 formed at least partially along the length of the lever 48. The contoured slot 56 preferably extends from the second end 54 of the contoured lever 48 at least partially along the length of the contoured lever 48 toward the first end 50. The lock pin 60 is received within the contoured slot 56 such that the contoured lever 48 is slidable with respect to the lock pin 60. The lock pin 60 may include a nut 62 on its distal end for retaining the lock pin 60 within the contoured slot 56.

The contoured lever 48 and contoured slot 56 are of a sufficient length such that the contoured lever 48 may move along the lock pin 60 when the hood H is moved between open and closed positions. The contoured lever 48 and contoured slot 56 are also of a suitable shape and geometry to move uninhibited along the lock pin 60. More specifically, the contoured lever 48 and contoured slot 56 are substantially arcuate in shape such that they move along the lock pin 60 in a necessarily arcuate fashion along with the hood H. Moreover, the contoured slot 56 includes first and second ends, with an arcuate, curved portion 58 extending between the first and second ends and a transverse end portion 68 transversely intersecting the curved portion 58 at the second end of the contoured slot 56. The lock pin 60 is slidable along the curved portion 58 and into and out of the transverse end portion 68.

The transverse end portion 68 of the contoured slot 56 defines a portion of a lock detent 64 within the second end 54 of the contoured lever 48. The lock detent 64 further includes a lip 72 formed on the contoured lever 48 at the corner defined by the transverse end portion 68 and the curved portion 58 of the contoured slot 56 (see also FIG. 6). The lip 72 extends into the transverse end portion 68 towards the second end 54 of the contoured lever 48 to define a pin-receiving portion 74 sized and configured to receive and retain the lock pin 60 therein.

The contoured lever 48 is slidable about the lock pin 60 such that the hood H is automatically locked in the open position when it is moved into the open position. More specifically, the contoured lever 48 travels with the hood mount bracket 22 in a substantially counter-clockwise, arcuate fashion along the lock pin 60 as the hood is being opened. The contoured lever 48 travels along the lock pin 60 until the lock pin 60 is received within the transverse end portion 68 of the lock detent 64. When the lock pin 60 moves into the transverse end portion 68, the contoured lever 48 rotates downwardly in a clockwise direction about pin 52 due to gravitational effects. The contoured lever 48 rotates until the lock pin 60 is then received within the pin-receiving portion 74, thereby locking the hood H in the open position.

Figure 4:
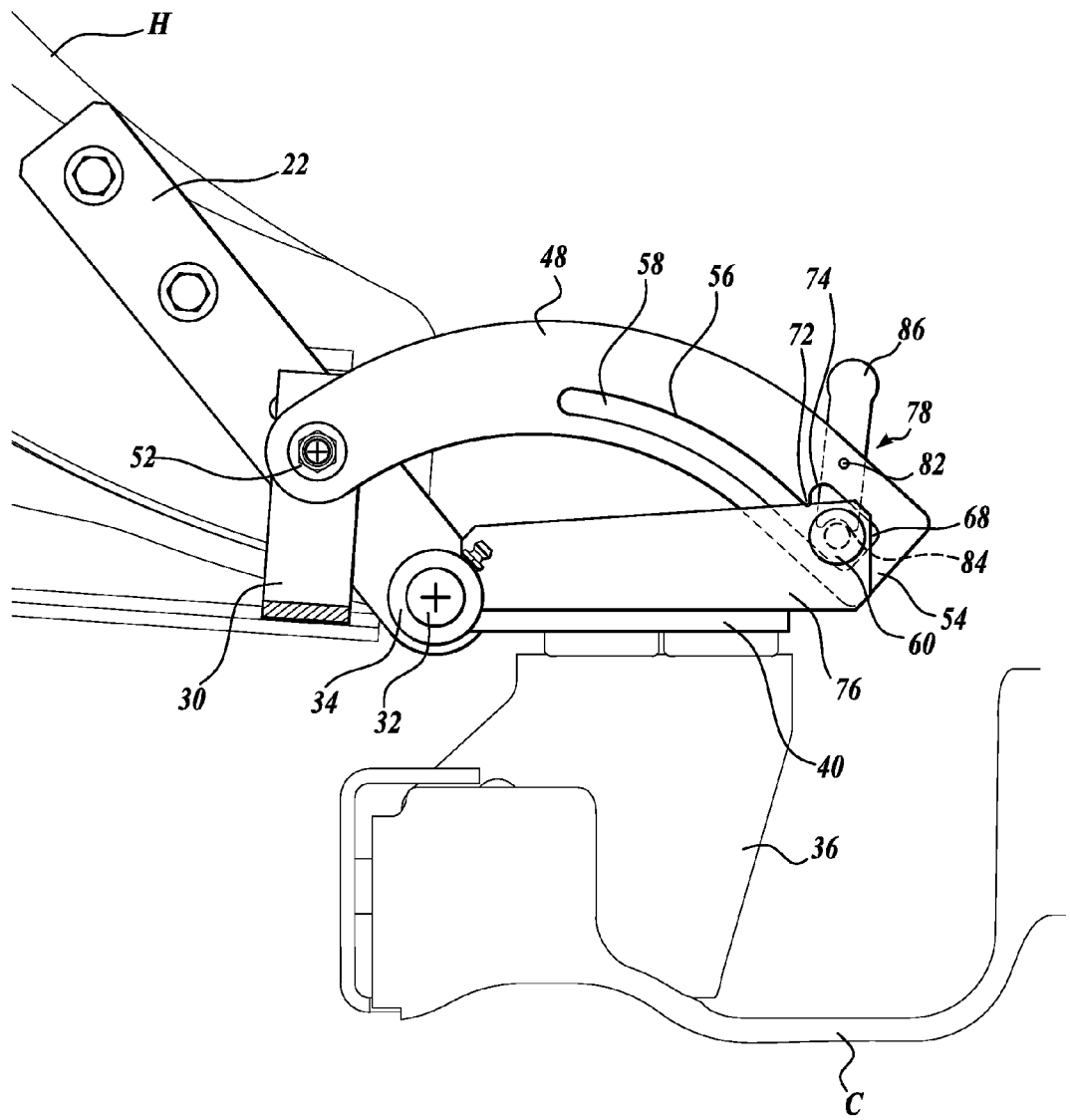
FIG. 4 is a side plan view of the hood support of FIG. 1, wherein the hood is in an open, unlocked position.

To unlock the hood H, the contoured lever 48 is rotated upwardly in a counter-clockwise direction about pin 52 until the lock pin 60 is positioned within the curved portion 58 of the contoured slot 56, as shown in FIG. 4. With the lock pin 60 positioned within the curved portion 58, the contoured lever 48 is free to slide along the lock pin 60. As such, the contoured lever 48 can move with the hood H in a clockwise direction until the hood H is in the closed position, as shown in FIGS. 5 and 6.

Referring to FIGS. 2 and 3, the hood support 10 further includes a release handle 78 suitable for maintaining the hood H in an open, unlocked position and automatically returning to a locked position when the hood H is moved into the closed position. The release handle 78 is pivotally coupled to the second end 54 of the contoured lever 48 through a pin or other suitable device that defines a release handle pivot 82. The release handle 78 is an elongated lever having a contoured end 84 and a weighted end 86, the contoured end 84 being sized and configured to engage the lock pin 60. The weighted end 86 may be defined by an off-center placement of the release handle pivot 82 or instead by an oversized end portion that causes the release handle 78 to pivot about the lever pivot 82 due to gravitational effects.

The release handle 78 is configured to engage the lock pin 60 and retain the lock pin 60 in an unlocked position within the curved portion 58 of the contoured slot 56. More specifically, the release handle 78 is pivotally secured on the contoured lever 48 such that it is engageable with the lock pin 60 when the contoured lever 48 is rotated upwardly in a counter-clockwise direction about pin 52 to unlock the hood H, as described above. Thus, when the contoured lever 48 is lifted upwardly to unlock the hood H, the release handle 78 is pivoted by the operator about the release handle pivot 82 until the contoured end 84 engages the lock pin 60 and maintains the contoured lever 48 in a lifted position with respect to the lock pin 60. The release lever 78 is also sized and configured to position the lock pin 60 within the curved portion 58 of the contoured slot 56. As such, the contoured lever 48 can slide along the lock pin 60 when the operator desires to close the hood H.

Figure 5:
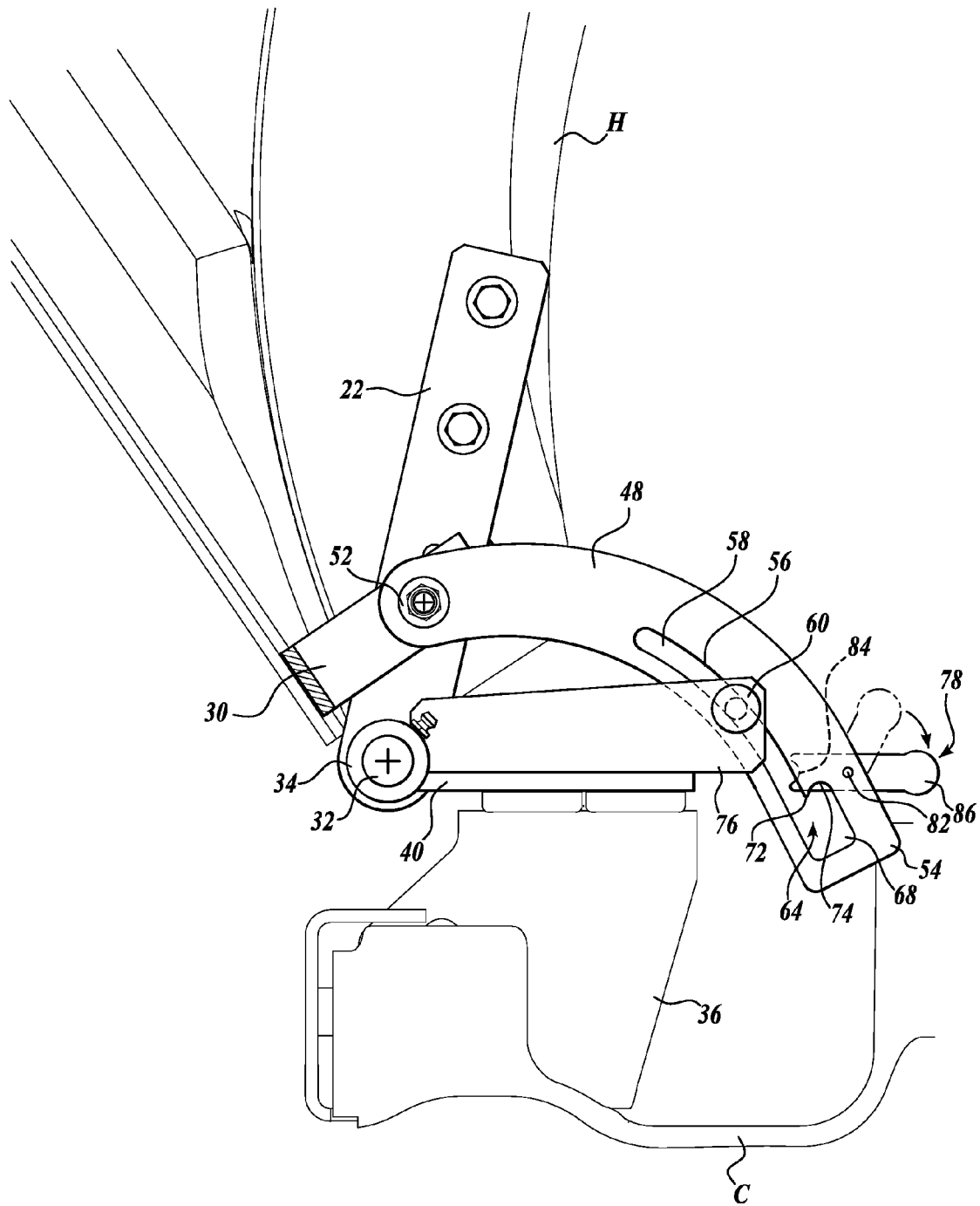
FIG. 5 is a side plan view of the hood support of FIG. 1, wherein the hood is being moved from an open, unlocked position to a closed position.
Figure 6:
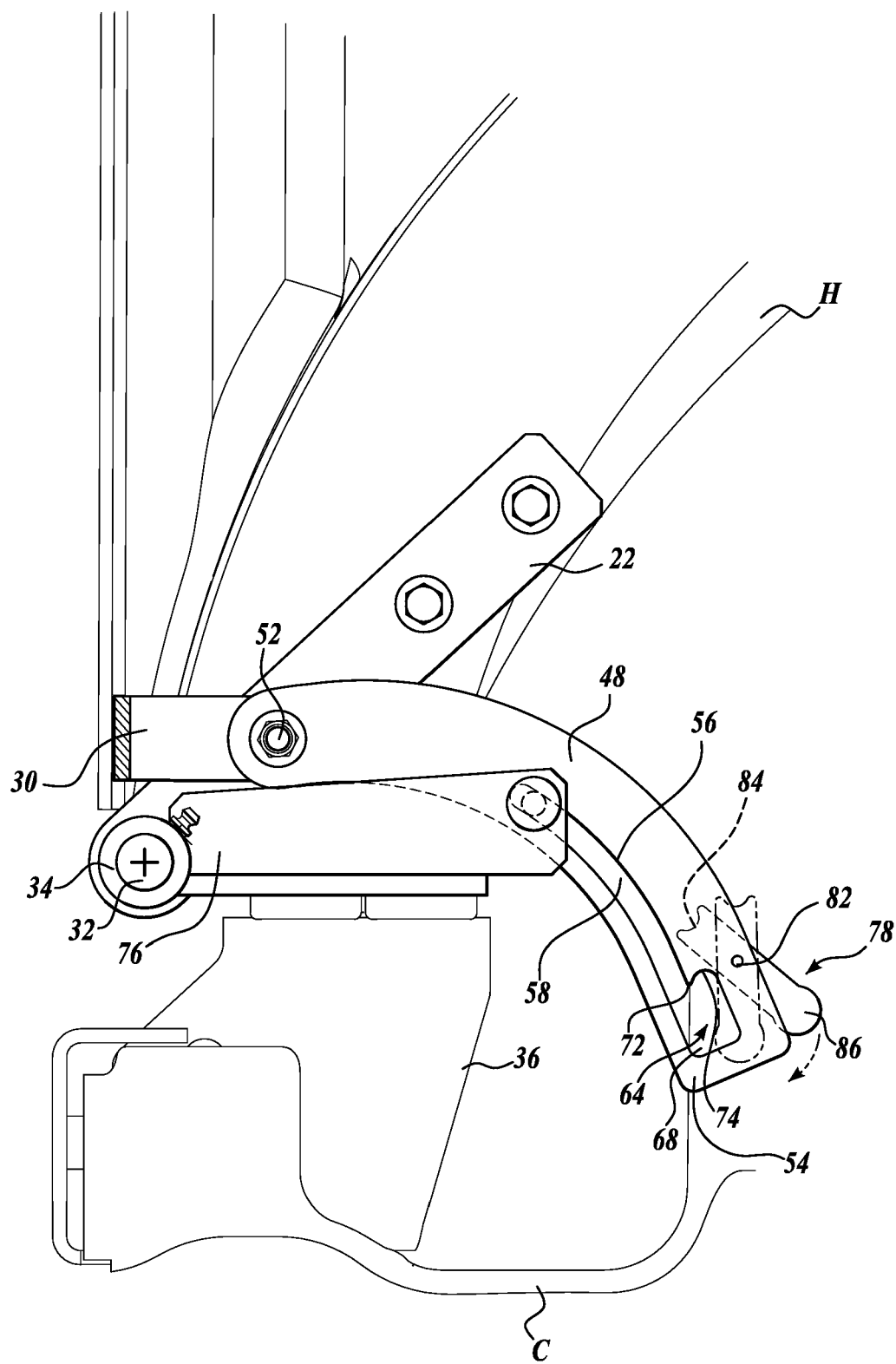
FIG. 6 is a side plan view of the hood support of FIG. 1, wherein the hood is in a closed position.

Referring to FIGS. 5 and 6, the release handle 78 is configured to return to a locked position when the hood H is moved towards the closed position. As the hood H pivots about pin 32 in a clockwise direction and moves towards the closed position, the contoured lever 48 moves in a clockwise direction and slides along the lock pin 60. The movement of the contoured lever 48 dislodges the lock pin 60 from within the hold of the contoured end 84 of the release handle 78. Once the lock pin 60 is dislodged, the release handle 78 is free to pivot about the release handle pivot 82. The weighted end 86 of the release handle 78 causes the release handle 78 to pivot about the release handle pivot 82. The release handle 78 pivots until the release handle 78 is in a substantially upright or vertical position with the weighted end 86 positioned on the bottom of the release handle 78 and the contoured end 84 positioned on the top of the release handle 78. Thus, the release handle 78 automatically returns to a locked position when the hood H is closed.

Referring to FIGS. 3-6, the general operation of the hood support 14 will be hereinafter described. Referring first to FIG. 3, the hood H is rotated counter-clockwise about pin 32 until it is in the fully open position. The contoured lever 48 rotates counter-clockwise with the hood H and moves along the lock pin 60 until the lock pin 60 is received within the transverse end portion 68 of the lock detent 64. The second end 54 of the contoured lever 48 drops downwardly due to gravity until the lock pin 60 is received within the pin-receiving portion 74. With the lock pin 60 received with the pin-receiving portion 74, the hood H and contoured lever 48 are prevented from moving in a clockwise direction; and therefore, the hood H is automatically locked in the open position. As such, the hood H cannot close unexpectedly due to human error or outside conditions such as wind.

Now referring to FIG. 4, to unlock the hood H, the user lifts the contoured lever 48 upwardly in a counter-clockwise direction about pin 52 until the lock pin 60 is positioned within the curved portion 58 of the contoured slot 56. The user then pivots the release handle 78 about the release handle pivot 82 until the contoured end portion 84 of the release handle 78 engages the lock pin 60. The release handle 78 braces against the lock pin 60 to retain the contoured lever 48 in a raised position with respect to the lock pin 60. As such, the lock pin 60 will not catch on the pin-receiving portion 74 of the lock detent 64 if the contoured lever 48 slides along the lock pin 60. Thus, the hood H is in an open, unlocked position.

Referring to FIGS. 5 and 6, with the hood H unlocked, the hood H can be rotated in a clockwise direction to close the hood H. As the hood H moves towards the closed position in a clockwise direction, the contoured lever 48 slides along the lock pin 60. The rotation of the contoured lever 48 dislodges the lock pin 60 from within the hold of the contoured end 84 of the release handle 78, thereby allowing the release handle 78 to pivot back into a locked position.

If the hood H is thereafter rotated counter-clockwise into an open position, the contoured lever 48 slides along the lock pin 60 until the lock pin 60 is received within the pin-receiving portion 74 of the lock detent 64, as described above with reference to FIG. 3. Thus, the hood H is again automatically locked in the open position.

Now referring to FIGS. 7-12, an alternative embodiment of the hood support 114 will now be described. Similar to the hood support 14 described above, hood support 114 automatically locks the hood H of a vehicle in an open position until unlocked by an operator. The hood support 114 is shown in combination with a heavy duty truck having a hood H pivotally mounted to a portion of the vehicle, such as the chassis C. The hood support 114 may instead be employed with any suitable vehicle having any preferred hood and chassis design. Accordingly, the following description and illustrations herein should be considered illustrative in nature, and thus not limiting on the scope of the present disclosure.

Figure 7:
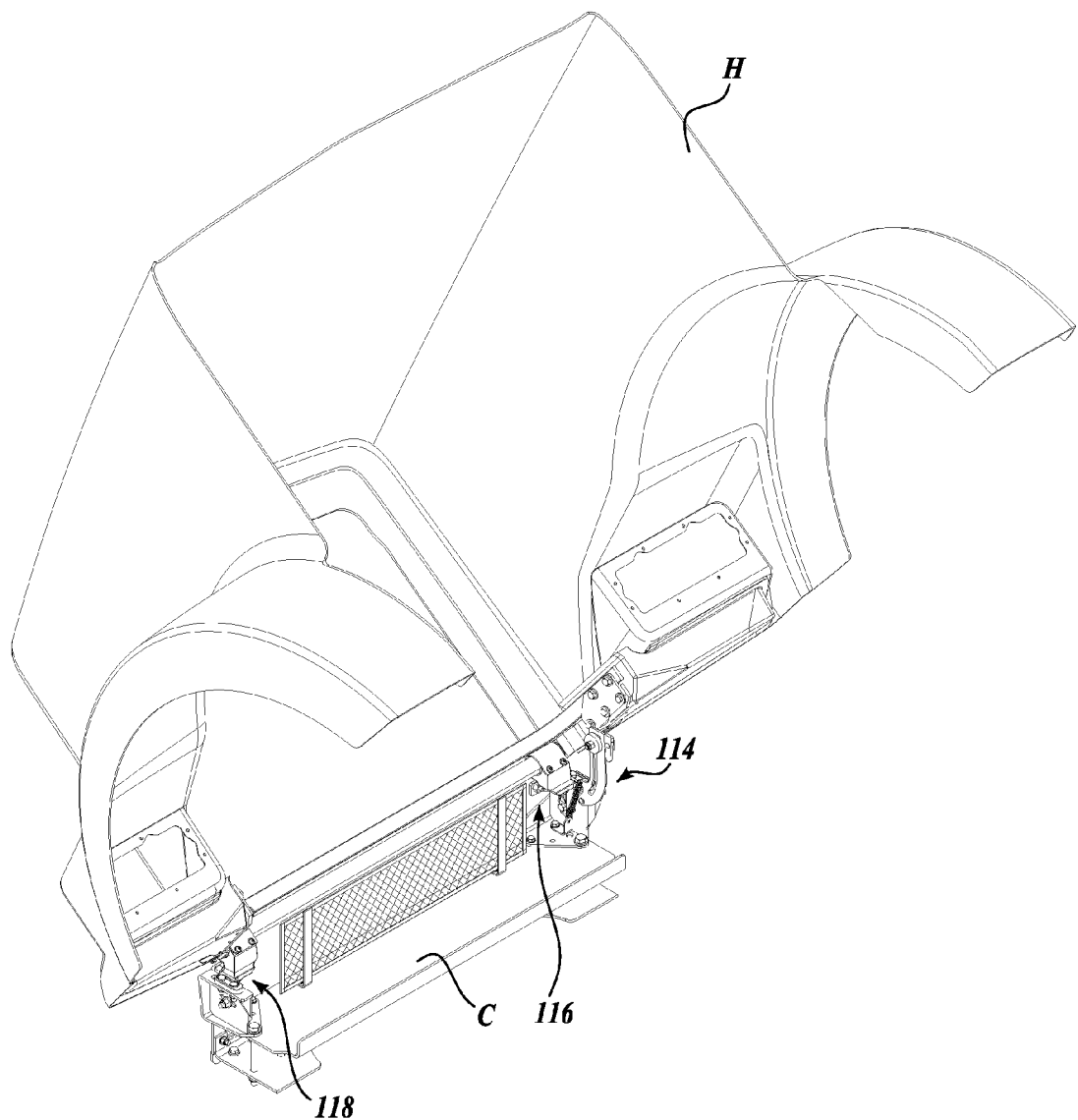
FIG. 7 is an environmental view of an alternate embodiment of a hood support shown in use with a vehicle having a hood moveable between an open and closed position, wherein the hood is in the open position.

Referring to FIG. 7, the hood H is pivotally coupled at its forward end to the chassis C through suitable first and second substantially identical hinge assemblies 116 and 118 well known in the art. The hood H pivots about the first and second hinge assemblies 116 and 118 to move between open and closed positions. It is preferred that the first and second hinge assemblies 116 and 118 are disposed on the right and left sides of the hood H for coupling the hood H to the chassis C. However, it should be appreciated that only one hinge assembly may instead be used. Moreover, any suitable hinge assembly may be used to pivotally couple the hood H to the chassis C.

Figure 8:
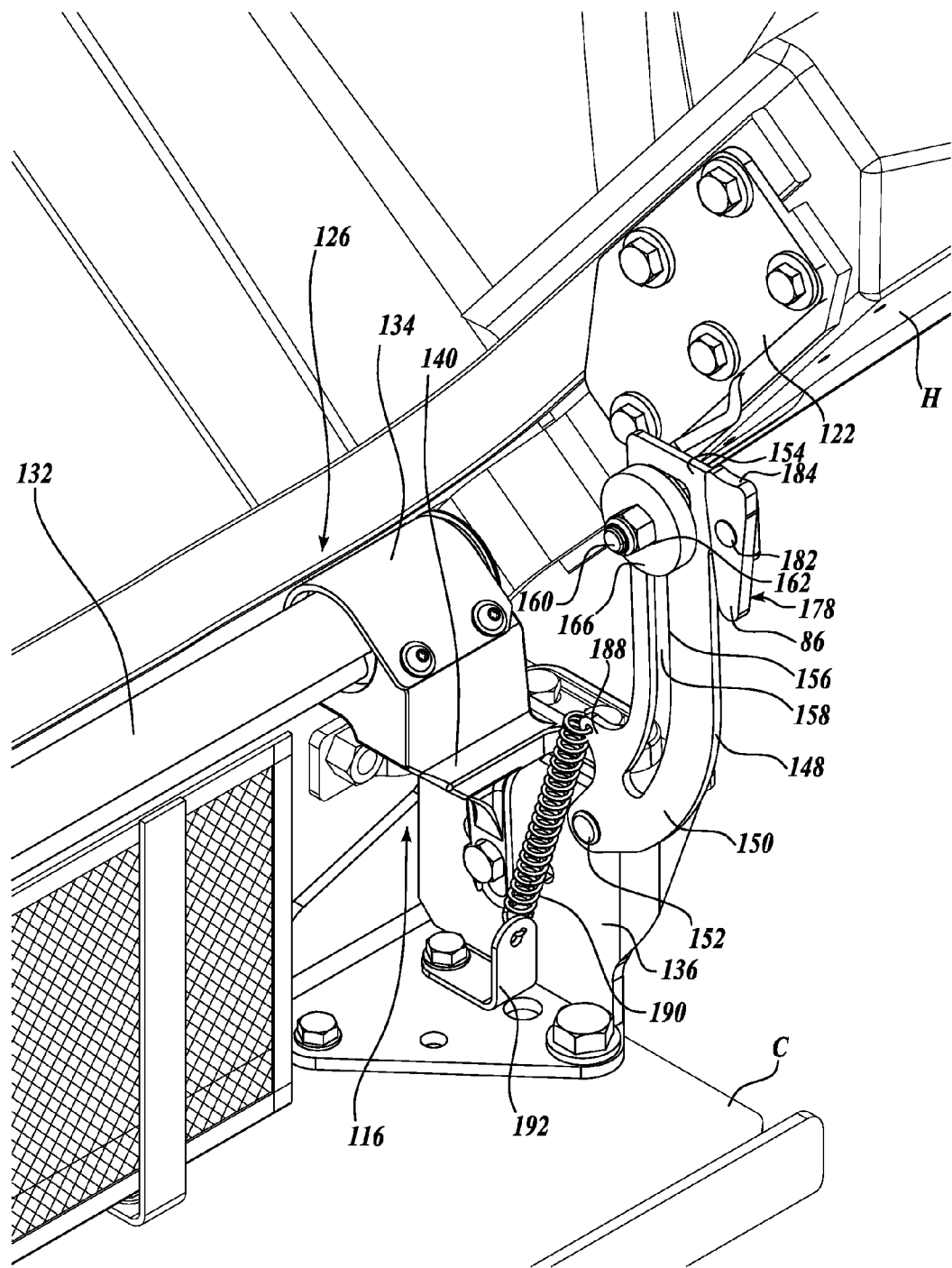
FIG. 8 is an isometric view of the hood support of FIG. 7, wherein the hood is shown in an open, locked position.

Referring to FIG. 8, to better illustrate aspects of the hood support 114, the first hinge assembly 116 will be hereinafter generally described. The first hinge assembly 116 includes a collar 134 that pivotally receives a pin 132 therein. The pin 132 extends between the first and second hinge assemblies 116 and 118 and is adapted to rotate within the collars 134 of each hinge assembly 116 and 118. The pin 132 extends between lateral sides of the hood H such that the hood H may pivot with the pin 132 within collar 134 between open and closed positions.

Figure 9:
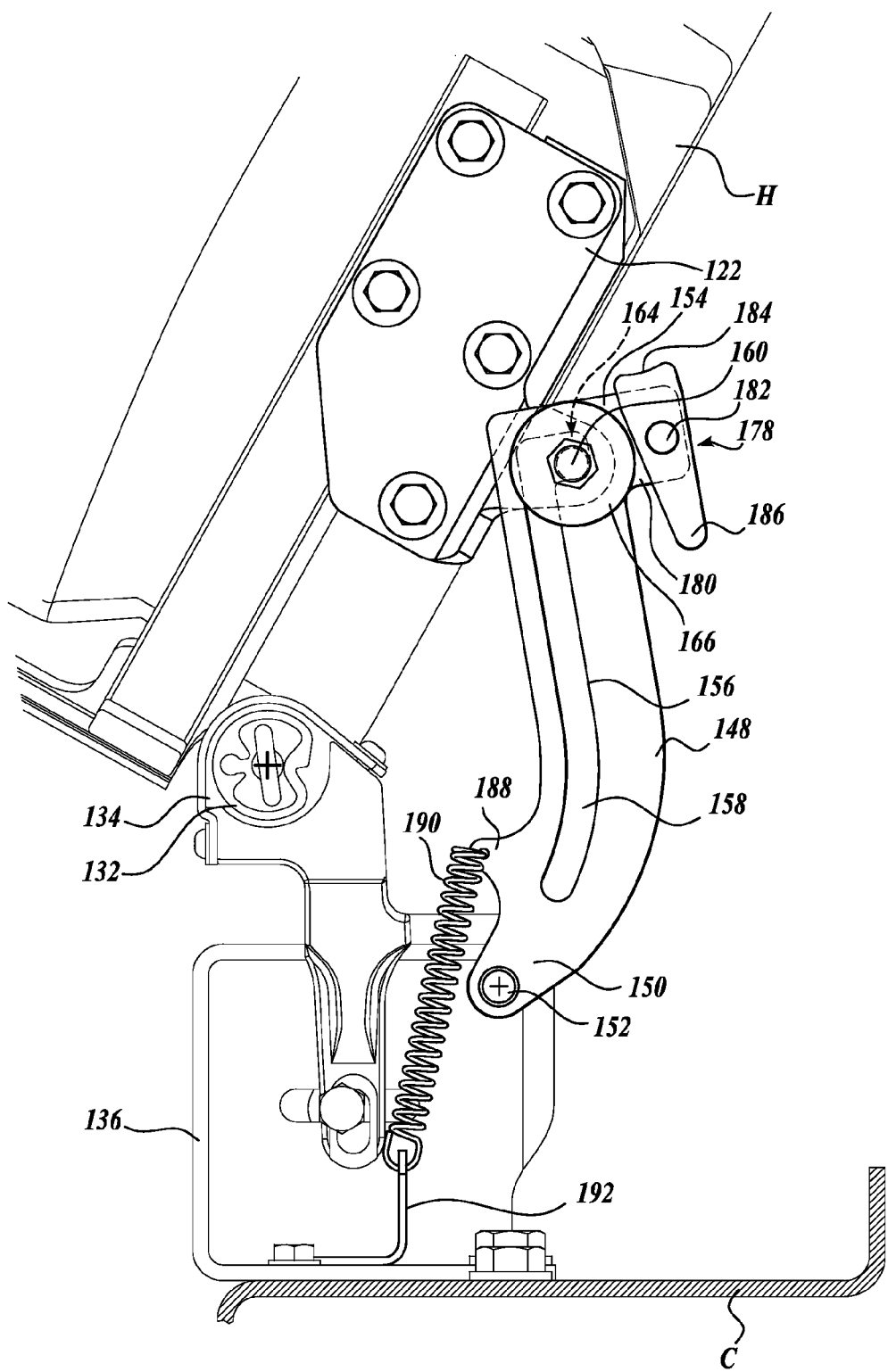
FIG. 9 is a side plan view of the hood support of FIG. 7, wherein the hood is in an open, locked position.

Referring to FIGS. 8 and 9, the hinge assemblies 116 and 118 are mounted to the chassis C such that the hood H is pivotal with respect to the chassis C. A collar bracket 140 extends outwardly from the collar 134 and is mounted to the chassis C through a chassis mounting bracket 136. The collar bracket 140 and chassis bracket 136 may be of any suitable design to appropriately secure the hinge assembly 116 to the chassis C such that the hood H is pivotal with respect to the chassis C.

Figure 10:
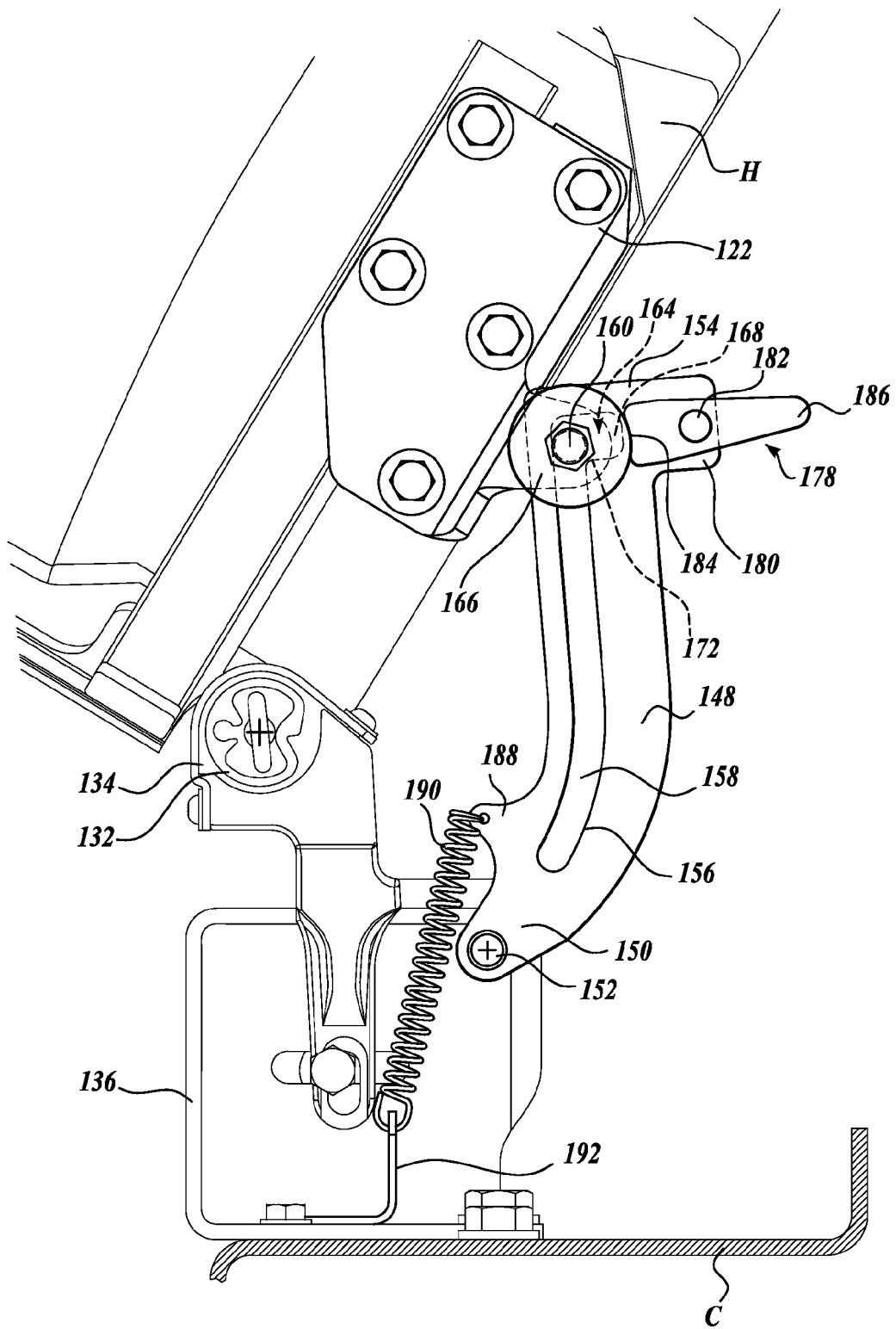
FIG. 10 is a side plan view of the hood support of FIG. 7, wherein the hood is in an open, unlocked position.

Referring to FIGS. 8-10, the hood support 114 will now be described in detail. The hood support 114 is disposed between the hood H and the chassis C and is configured to automatically lock the hood H in the open position when the hood H is moved into the open position. The hood support 114 includes a contoured lever 148 having first and second ends 150 and 154 that is pivotally mounted to the chassis bracket 136 at its first end 150. Preferably, the contoured lever 148 is pivotally mounted to the chassis bracket 136 with a suitable fastener 152.

The contoured lever 148 is adjustably mounted to the hood H at its second end 154 through a lock pin 160. The lock pin 160 extends outwardly from a hood mount bracket 122 secured to the hood H in any suitable manner. The hood mount bracket 122 may be any suitable design for positioning the lock pin 160 to engage the contoured lever 148.

The contoured lever 148 includes a contoured slot 156 formed at least partially along the length of the contoured lever 148 that is adapted to slidably receive the lock pin 160 therein. The lock pin 160 extends through the contoured slot 156 and a lock washer 162 is received on the end of the lock pin 160. A nut 162 or other suitable device is used to secure the washer 162 on the lock pin 160 and retain the lock pin 160 within the contoured slot 156.

The contoured slot 156 includes a substantially curved portion 158 and a transverse end portion 168 transversely intersecting the curved portion 158 at the second end 154 of the contoured lever 148. The contoured slot 156 slidably receives the lock pin 160 such that the lock pin 160 is slidable along the curved portion 158 and into and out of the transverse end portion 168.

The contoured lever 148 and contoured slot 156 are of a sufficient length such that the lock pin 160 may slide within the contoured slot 156 when the hood H is moved between open and closed positions. The contoured slot 156 extends from the second end 154 of the contoured lever 148 at least partially along the length of the contoured lever 148 towards the first end 150. The contoured lever 148 and contoured slot 156 are also of a suitable shape and geometry to allow the lock pin 160 and hood H to transition smoothly between open and closed positions. More specifically, the contoured lever 148 and contoured slot 156 are at least somewhat curved or arcuate in shape to follow the path of the hood H as it is rotated about the pin 132 into open and closed positions.

The contoured slot 156 is in communication with a lock detent 164 formed at the second end 154 of the contoured lever 148. The lock detent 164 is defined in part by the transverse end portion 168 of the contoured slot 156. A lip 172 is defined on the contoured lever 148 at the intersection of the curved portion 158 of the contoured slot 156 and the transverse end portion 168. The transverse end portion 168 is sized and configured to receive and retain the lock pin 160 therein.

The lock pin 160 is slidable within the contoured slot 156 of the contoured lever 148 such that the hood H is automatically locked in the open position when it is moved into the open position. More specifically, as the hood H is moved counter-clockwise about pin 132 into the open position, the lock pin 160 travels upwardly within the curved portion 158 of the contoured slot 156. The counter-clockwise movement of the hood H and lock pin 160 also moves the contoured lever 148 in a substantially counter-clockwise direction about fastener 152.

The hood H is rotated counter-clockwise until the lock pin 160 is received within the upper end of the contoured slot 156 adjacent the transverse end portion 168. With the lock pin 160 positioned within the upper end of the contoured slot 156, the contoured lever 148 falls downwardly in a substantially counter-clockwise direction about pin 152 due to gravitational effects, and the lock pin 160 is received within the transverse end portion 168 of the lock detent 164. Moreover, the lock pin 160 abuts the shoulder 172 when received within the transverse end portion 168 to prevent the lock pin 160 from sliding within the contoured slot 156.

A biasing device, such as an extension spring 190, may extend between the concave lateral edge of the contoured lever 148 and the chassis C to bias the contoured lever 148 in the counter-clockwise direction. More specifically, a protrusion 188 may extend outwardly from the concave lateral edge of the contoured lever 148 to provide a connection point for a first end of the extension spring 190, and the second end of the extension spring 190 may be secured to the chassis bracket 136 through a spring mounting bracket 192. With the contoured lever 148 biased in the counter-clockwise direction, the lock pin 160 is firmly secured within the transverse end portion 168 of the lock detent 164 to secure the hood H in the open position.

The hood support 110 further includes a release handle 178 suitable for maintaining the hood H in an open, unlocked position and automatically returning to a locked position when the hood H is moved into the closed position. The release handle 178 is pivotally coupled to the contoured lever 148 through a pin or other suitable device that defines a release handle pivot 182. The release handle 178 is an elongated lever having a contoured end 184 sized and configured to engage the lock pin washer 162 and a weighted end 186 formed opposite the contoured end 84. The weighted end 186 may be defined by an off-center placement of the release handle pivot 182 or instead by an oversized end portion that causes the release handle 178 to pivot about the release handle pivot 182 due to gravitational effects.

The release handle 178 is configured to engage the lock washer 162 to retain the lock pin 160 in an unlocked position within the upper end of the contoured slot 156 adjacent to the transverse end portion 168. More specifically, the release handle 178 is pivotally secured on the contoured lever 148 such that it is engageable with the lock washer 162 when the lock pin 160 is positioned within the upper end of the contoured slot 156. It should be appreciated that the release lever 178 may instead directly engage the lock pin 160.

When the lock pin 160 is received within the transverse end portion 168 of the lock detent 164, the contoured lever 148 may be rotated in a clockwise direction about pin 152 to position the lock pin 160 within the upper end of the contoured slot 156. The release handle 178 is thereafter pivoted about the release handle pivot 182 until the contoured end 184 engages the lock washer 162 and maintains the contoured lever 148 in a rotated position with respect to the lock pin 160. As such, the lock pin 160 is retained within the upper end of the contoured slot 156 such that the lock pin 160 can slide within the contoured slot 156 when the user desires to close the hood H. Accordingly, the release handle 178 maintains the hood H in an unlocked position such that it can be closed when the user desires to close the hood.

Figure 11:
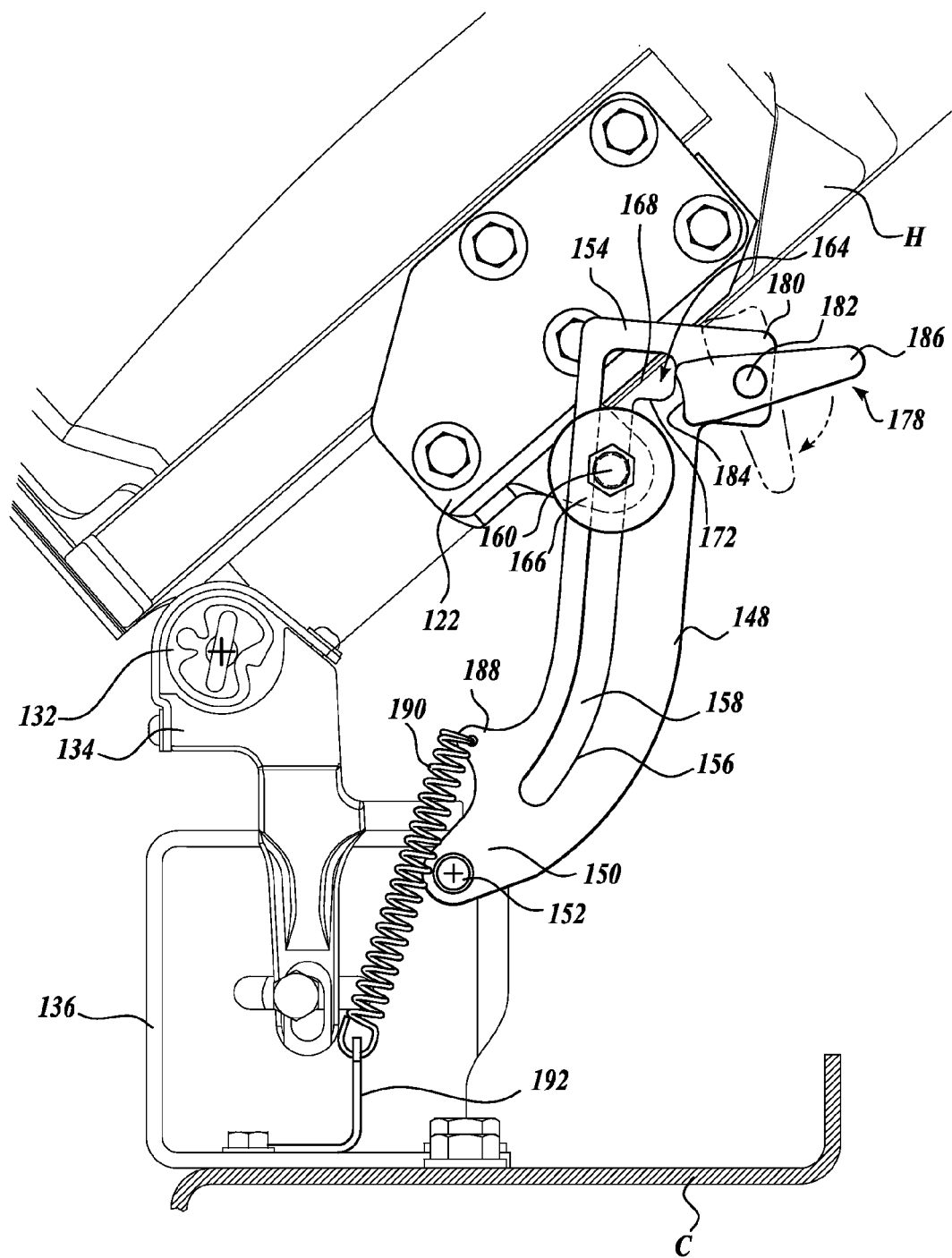
FIG. 11 is a side plan view of the hood support of FIG. 7, wherein the hood is being moved from an open, unlocked position to a closed position.
Figure 12:
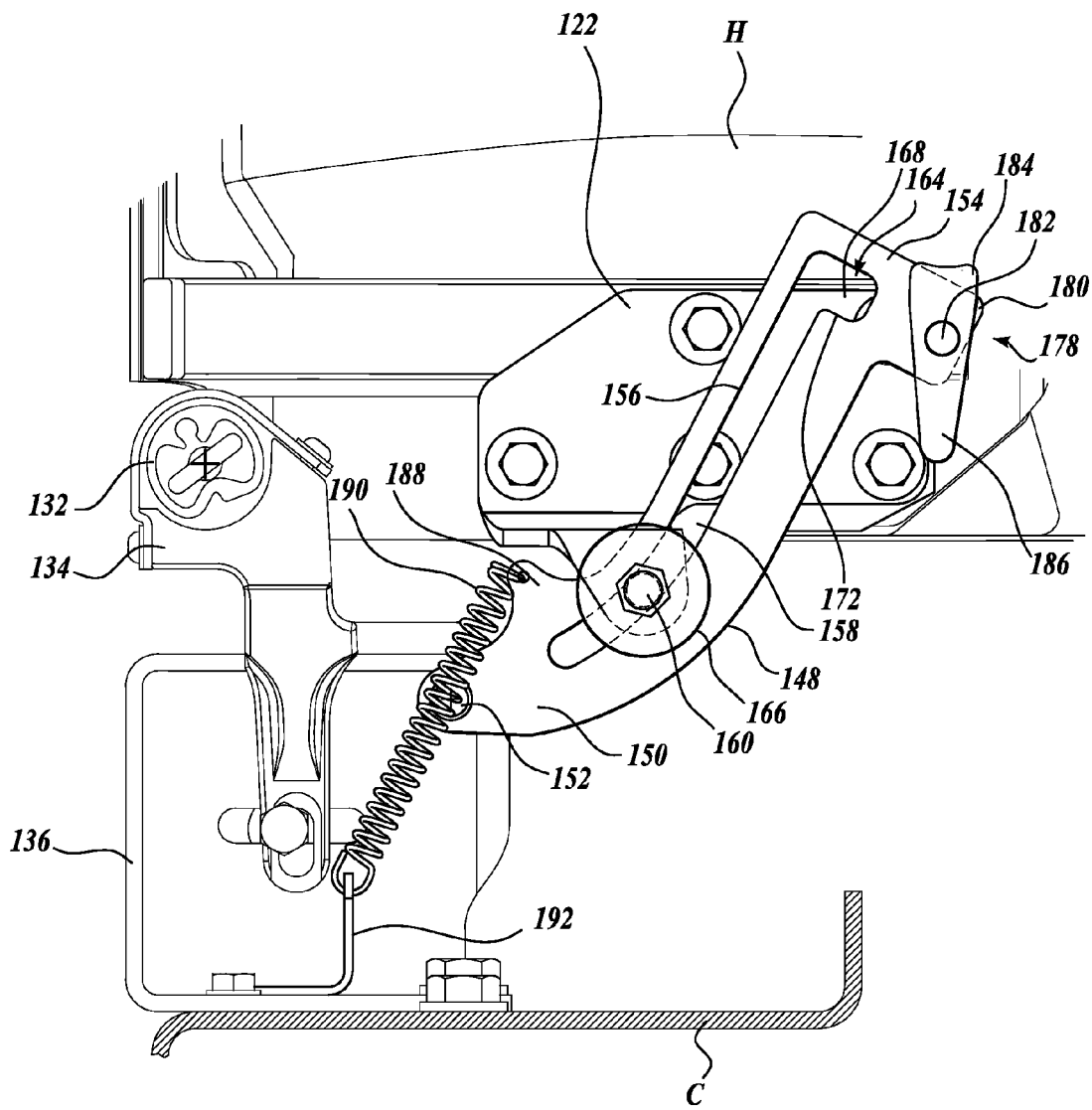
FIG. 12 is a side plan view of the hood support of FIG. 7, wherein the hood is in a closed position.

Referring to FIGS. 11 and 12, the release handle 178 is configured to return to a locked position when the hood H is moved towards the closed position. As the hood H pivots clockwise about pin 132 towards the closed position, the lock pin 160 slides downwardly within the contoured slot 156. The lock pin 160 is moved downwardly within the contoured slot 156 by the hood H until the lock pin washer 162 is dislodged from within the hold of the contoured end 184 of the release handle 178. Once the lock pin washer 162 is dislodged, the release handle 178 is free to pivot about the release handle pivot 182. The weighted end 186 of the release handle 178 causes the release handle 178 to pivot about the release handle pivot 182. The release handle 178 pivots until the release handle 178 is in a substantially upright or vertical position with the weighted end 186 positioned on the bottom of the release handle 178 and the contoured end 184 positioned on the top of the release handle 178. Thus, the release handle 178 automatically returns to a locked position when the hood H is closed.

Referring to FIGS. 9-12, the general operation of the hood support 114 will be hereinafter described. Referring first to FIG. 9, the hood H is rotated counter-clockwise about pin 132 until it is in the fully opened position. The contoured lever 148 rotates counter-clockwise about pin 152 to follow the movement of the hood H, and the lock pin 160 moves upwardly within the contoured slot 156. The hood H is rotated counter-clockwise until the lock pin 160 is received within the upper end of the contoured slot 156. The second end 154 of the contoured lever 148 is biased in a counter-clockwise direction about pin 152 by the extension spring 190, and the contoured lever 148 rotates counter-clockwise until the lock pin 160 is received within the transverse end portion 168 of the lock detent 164. With the lock pin 160 received within the transverse end portion 168, the lock pin 160 and hood H are prevented from moving in a clockwise direction; and therefore, the hood H is automatically locked in the open position. As such, the hood H cannot close unexpectedly.

Now referring to FIG. 10, to unlock the hood H, the user rotates the contoured lever 148 about pin 152 in a clockwise direction until the lock pin 160 is positioned within the upper end of the contoured slot 156. The user then pivots the release handle 178 about the release handle pivot 82 until the contoured end portion 184 of the release handle 178 engages the lock washer 162. The release handle 178 braces against the lock washer 162 to retain the contoured lever 48 in a rotated position with respect to the lock pin 160. As such, the lock pin 160 will not catch on the shoulder 172 of the lock detent 164 when the hood H is rotated clockwise and moved into a closed position. Thus, the hood H is in an open, unlocked position.

Referring to FIGS. 10-12, with the hood H unlocked, the hood H can be moved in a clockwise direction to close the hood H. As the H moves towards the closed position, the lock pin 160 slides downwardly within the contoured slot 156. The movement of the lock pin 160 dislodges the lock washer 162 from within the hold of the contoured end 184 of the release handle 178, thereby allowing the release handle 178 to pivot back into a locked position.

If the hood H is thereafter moved counter-clockwise into an open position, the lock pin 160 slides upwardly within the contoured slot 156 until the lock pin 160 is received within the upper end of the contoured slot 156, as described above with reference to FIG. 9. The contoured lever 148 is thereafter biased in a counter-clockwise direction to move the lock pin 160 into the transverse end portion 168 of the lock detent 164. Thus, the hood H is automatically locked in the open position.

While illustrative embodiments have been illustrated and described, it will be appreciated that various changes can be made therein without departing from the spirit and scope of the present disclosure.

The embodiments of the invention in which an exclusive property or privilege is claimed are defined as follows:

1. A hood assembly for a vehicle, comprising:
   (a) a hood pivotally coupled to the vehicle and moveable between open and closed positions;
   (b) a contoured lever movably disposed between the hood and a portion of the vehicle;
   (c) a slot formed within the lever, the slot having first and second ends;
   (d) a pin mounted to a portion of the vehicle, the pin slidably received within the slot;
   (e) a lock detent formed within the contoured lever, the lock detent in communication with the second end of the slot, wherein when the hood moves into the open position, the pin is received within the lock detent, thereby locking the hood in the open position; and
   (f) a release handle pivotally secured to the lever, the release handle sized and geometrically configured to move between a first position, wherein the release handle physically contacts the pin and positions the pin within the slot, and a second position, wherein the release handle comes out of physical contact with the pin.

2. The hood assembly of claim 1, wherein the lever is pivotally mounted to the hood.

3. The hood assembly of claim 1, wherein the lever is pivotally mounted to a portion of the vehicle and the pin is mounted to the hood.

4. The hood assembly of claim 1, wherein the release handle includes a weighted end that causes the release handle to pivot into a substantially vertical position when the release handle disengages the pin.

5. The hood assembly of claim 1, wherein the hood is in an unlocked, open position when the release handle engages and positions the pin within the slot.

6. The hood assembly of claim 1, wherein when the hood moves into the open position, the lever rotates in a first direction until pin is received within the lock detent.

7. The hood assembly of claim 6, wherein the contoured lever is rotated in a second direction to position the pin within the slot.

8. The hood assembly of claim 1, wherein the slot includes a curved portion and a transverse end portion.

9. The hood assembly of claim 8, wherein the lock detent is defined at least in part by the transverse end portion.

10. The hood assembly of claim 9, wherein the lock detent further comprises a lip formed on the lever at the intersection of the transverse end portion and the curved portion, the lip defining a pin-receiving portion.

11. A hood assembly for a vehicle, comprising:
    (a) a hood pivotally coupled to the vehicle and moveable between open and closed positions;
    (b) a contoured lever moveably disposed between the hood and a portion of the vehicle;
    (c) a slot formed within the contoured lever, the slot having first and second ends;
    (d) a pin mounted to a portion of the vehicle, the pin slidably received within the slot;
    (e) a lock detent formed within the contoured lever, the lock detent in communication with the second end of the slot, wherein when the hood moves into the open position, the pin is received within the lock detent, thereby locking the hood in the open position; and
    (f) a release handle pivotally secured to the contoured lever and moveable between a disengaged position, wherein the release handle comes out of physical contact with a portion of the pin, and an engaged position, wherein the release handle physically contacts the portion of the pin and positions the pin within the slot, the release handle in the disengaged position when the hood is in a locked, open position, the release handle moved into the engaged position to position the pin within the slot to allow the hood to move towards the closed position, wherein the release handle returns to the disengaged position when the hood is moved towards the closed position.

12. The hood assembly of claim 11, wherein the lever is pivotally mounted to the hood.

13. The hood assembly of claim 11, wherein the lever is pivotally mounted to a portion of the vehicle and the pin is mounted to the hood.

14. The hood assembly of claim 11, wherein the release handle includes a weighted end that causes the release handle to pivot into a substantially vertical position when the release handle returns to the disengaged position.

15. The hood assembly of claim 11, wherein when the hood moves into the open position, the lever rotates in a first direction until pin is received within the lock detent.

16. The hood assembly of claim 15, wherein the contoured lever is rotated in a second direction to position the pin within the slot.

17. A hood assembly for a vehicle, comprising:
    (a) a hood pivotally coupled to the vehicle and moveable between open and closed positions;
    (b) a contoured lever pivotally mounted to the hood;
    (c) a slot formed within the lever, the slot having first and second ends;
    (d) a pin mounted to a portion of the vehicle, the pin slidably received within the slot;
    (e) a lock detent formed within the contoured lever, the lock detent in communication with the second end of the slot, wherein when the hood is in the open position, the lever rotates in a first direction until the pin is received within the lock detent, thereby locking the hood in the open position; and
    (f) a release handle pivotally secured to the lever, the release handle sized and geometrically configured to move between a first position, wherein the release handle physically contacts a portion of the pin and positions the pin within the slot when the lever is rotated in a second direction, and a second position, wherein the release handle comes out of physical contact with the portion of the pin.

18. The hood assembly of claim 15, wherein the lever slides along the pin as the hood is moved between the open and closed positions.

19. The hood assembly of claim 15, wherein the lock detent further comprises a lip that defines a pin-receiving portion.

20. The hood assembly of claim 15, wherein the release handle includes a weighted end that causes the release handle to pivot into a substantially vertical position when the release handle-disengages the pin.

* * * * *